Dec. 11, 1951     G. S. MONK     2,578,013
VIEW FINDER AND DRIFT SIGHT
Filed Oct. 10, 1947
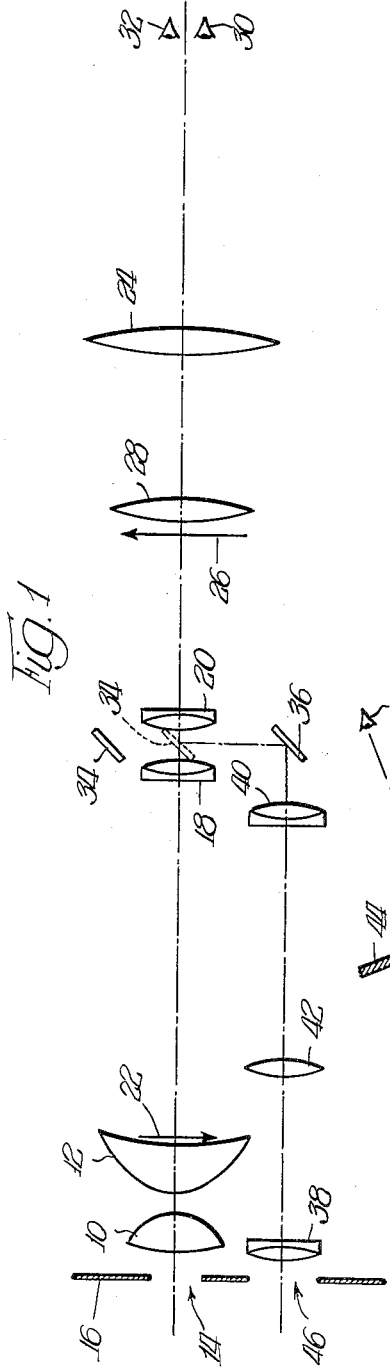
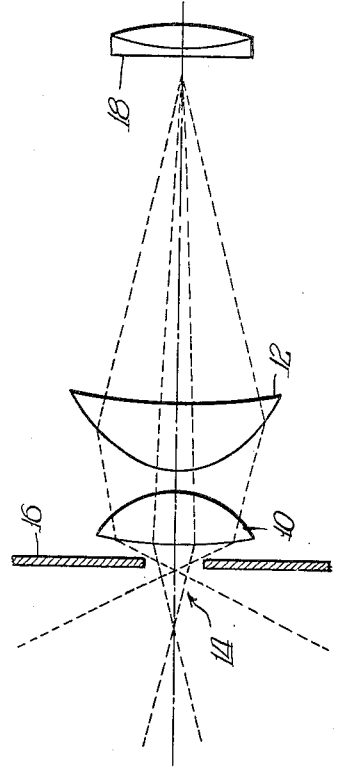
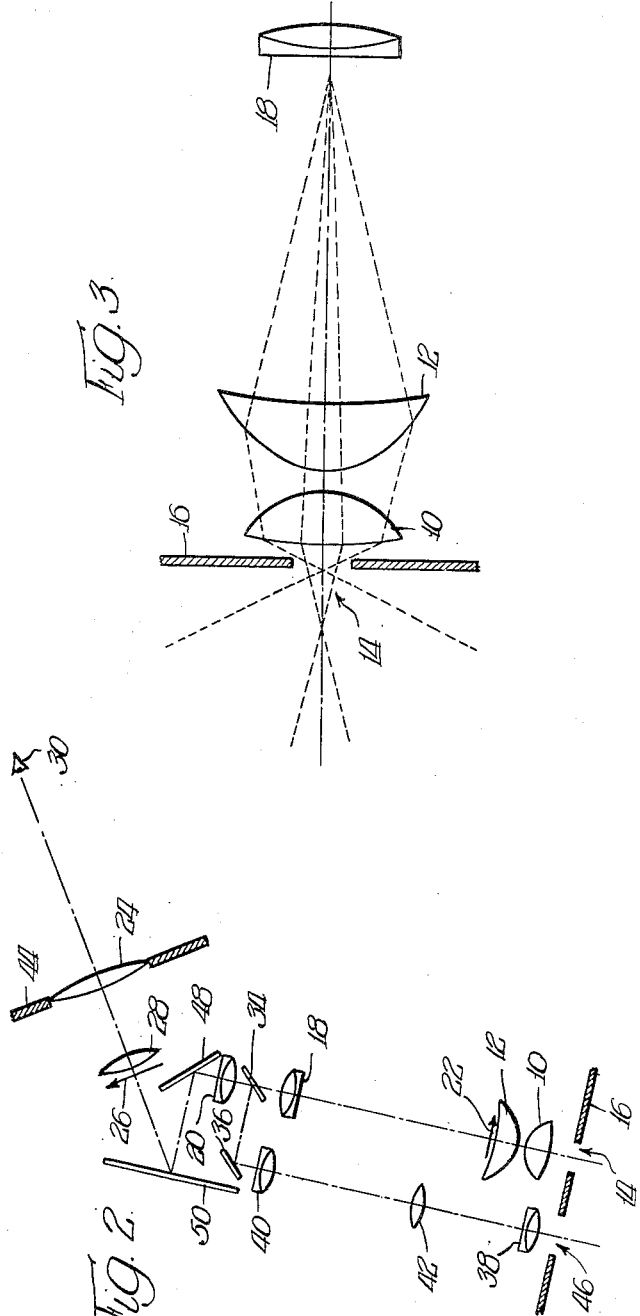
INVENTOR.
George S. Monk,
BY
Wilkinson, Huxley, Byron, & Hume
Attys.

Patented Dec. 11, 1951

2,578,013

UNITED STATES PATENT OFFICE 2,578,013

VIEW FINDER AND DRIFT SIGHT

George S. Monk, Chicago, Ill., assignor to Chicago Aerial Survey Co., Chicago, Ill., a corporation of Illinois Application October 10, 1947, Serial No. 779,061

4 Claims. (Cl. 88—32)

This invention relates to an optical instrument and, more particularly, to a device especially adapted to be used as a pilot's view finder and drift sight in aircraft.

Because of the construction of modern aircraft it is normally impossible for the pilot to see the terrain immediately below him when he is in the conventional position of control. It would be highly desirable to enable the pilot to obtain information concerning this area immediately below the aircraft without requiring the pilot to move from his seat or to apply his eye closely to the eyepiece of an optical instrument. It is highly impractical, in most instances, to provide a window in the bottom of the fuselage which is large enough to provide a suitable view of this area without the use of any optical instrument. Obviously, the most convenient place to display the picture of the terrain over which the aircraft is flying would be on the instrument panel which is continually scrutinized by the pilot under normal flight conditions.

It is therefore an object of this invention to provide means for displaying a picture on the instrument panel of the terrain over which an aircraft is flying.

It is also an object of this invention to provide an optical train which will transmit the image received through an opening of limited size in the floor of the fuselage by means of lenses and light reflecting means to a suitable position on the instrument panel.

Another object of this invention is to provide such an optical device which provides a relatively wide angle view of the area immediately below the aircraft even though the opening through which it is obtained is relatively small.

Another object of this invention is to provide such an optical instrument which although it provides an extremely wide angle of view produces an image which is substantially free from distortion.

A further object of this invention is to provide an optical instrument of the character described which has a long focus eyepiece of relatively large diameter which is adapted to be viewed by both eyes of the observer simultaneously and which therefore affords binocular vision.

It is a further object of this invention to provide an optical instrument of the character described, the eyepiece of which may be viewed by the observer from the normal pilot's position. It is therefore unnecessary for the pilot to change the position of his head when he desires to utilize the instrument since it is only necessary for him to train his eyes on the image seen in the eyepiece set in the instrument panel.

It is a further object of this invention to provide an optical instrument of the character described which can be used both as a view finder and drift sight, proper adjustments being easily made to shift from one type of instrument to the other.

It is a further object of this invention to provide an optical instrument of the character described which has two types of objective assemblies which can be selected at will by suitable adjustment of a reflecting means to provide either a view finder or drift sight.

It is a further object of this invention to provide an optical instrument of the character described which produces an erect image giving the pilot an unobstructed view of the area below which is substantially the same as he would obtain if he were looking downward through a large opening while facing in the direction of the flight.

It is an additional object of this invention to provide an optical instrument of the character described which produces an image having sufficiently good definition and freedom from distortion and other optical aberrations, so that the outlines of significant objects can readily be recognized.

Further objects and advantages of this invention will become evident as the description proceeds, and from an examination of the accompanying drawing which illustrates one embodiment of the invention and in which similar numerals refer to similar parts throughout the several views.

In the drawings:

Fig. 1 is a diagrammatic representation of the optical system to be used in the instrument embodying one form of this invention, the system being laid out in a straight line.

Fig. 2 is a diagrammatic representation of the optical system shown in Fig. 1, with light reflecting means added to enable the system to be installed in an aircraft in other than a straight line, the arrangement illustrated being such that would allow the light from the viewed area to be directed from the opening in the bottom of the fuselage to the instrument panel.

Fig. 3 is a detailed view of the objective assembly for the view finder and the opening in the fuselage associated therewith.

Referring now to Fig. 1, the optical system is illustrated without the mirrors or the like which are necessary to bring the image from the bottom of the fuselage to the instrument panel. Lenses 10 and 12 together form a wide angle objective assembly which is disposed adjacent the opening 14 in the fuselage 16. Lenses 18 and 20 are two well achromatized erecting lenses which serve to erect the inverted image 22 formed by the lenses 10 and 12 and form the erect image 26. Lens 24 is a simple biconvex lens of large diameter which serves to project the light from image 26 formed by the lenses 18 and 20 into the space to the right of lens 24 as viewed in Fig. 1. The lens 28 is a field lens placed near the image 26 to reduce or substantially eliminate any vignetting which may be present for a given arrangement of lenses. The eyes 30 and 32 of the observer are shown to the right of the lens 24.

The mirror 34 is disposed adjacent the lenses 18 and 20 so that it is normally outside the path of the light rays in the optical system just described, but it is capable of being moved by suitable positioning means between the lenses 18 and 20 and into the path of these rays at such an angle that it will cut off the light from the lens 18 and will be adapted to receive light from a second mirror 36. This second mirror 36 receives light from a second lens train which is substantially parallel to that previously described and is adapted to replace the objective assembly and first erecting lens when the mirror 34 is moved between the lenses 18 and 20 as just described. This second lens train is composed of two lenses 38 and 40 having the same focal length and the field lens 42 disposed therebetween, the three lenses constituting a telescope of unit power which produces an inverted image.

The instrument is therefore of dual character. The optical system made up of the lenses 10, 12, 18, 20, 28 and 24 form what may be referred to as a view finder. The objective assembly in this system is such that it is possible to get an undistorted view of a large area by looking into the eyepiece lens 24 with both eyes from an appropriate distance. When the mirror 34 is moved into the light path of this system making up the view finder the mirror 36 cooperate therewith to cause the lens train 38, 42 and 40 to be substituted for the objective assembly made up of the lenses 10 and 12 and the first erecting lens 18 of the view finder system. This arrangement provides a view with greater magnification of the middle portion of the same area previously viewed in the view finder and the instrument may now be employed as a drift sight. To this end a reticle may be placed at the image 26 and by proper choice of focal lengths and lens positions it will serve for both the drift sight and view finder if desired. Of course other suitable arrangements utilizing one or more reticles might be equally desirable. By way of example, a reticle might be disposed so as to appear in only one of the systems, or a separate reticle might be utilized in each system.

Since the two alternate systems are parallel and the ground is normally at a relatively great distance, the images obtained with the alternate systems are centered at the same point. The increase in magnification obtained when the lenses 38, 42, and 40 are utilized is necessary to enable the successful observation of sidewise drift, since with the very small magnification associated with the large angle of view, the rate of travel of a particular point across the field is too slow for continuous and accurate observation. As mentioned above, the three lenses 38, 42 and 40 constitute a telescope of unit power and since the system made up of lenses 20, 28 and 24 is also a telescope of approximately unit power, the entire train together with the mirrors for bringing the light from the opening 46 in the floor of the fuselage to the instrument panel constitutes a periscope of about unit power. This provides magnification suitable for a drift sight and at the same time the image will fill the eyepiece lens 24 and the system can be adjusted so that the image can be seen with an eye distance of 20 to 30 inches as desired.

The field of view in the view finder can be made as high as 120° whereas the field of view in the drift sight with unit power is approximately 25°. The construction of the objective assembly made up of the lenses 10 and 12 is largely responsible for the unusually wide angle of view obtainable with the former. As shown in Fig. 3, the adjacent surfaces of these two axially aligned lenses are aspherical. This is believed to be a novel and unusual feature of the instrument in that it has been found that such an arrangement results in a reduction to a negligible amount of the distortion of the image. Such a reduction over the wide angle view obtained is not possible with ordinary spherical surfaces in simple lenses.

By way of example, in an experimental model of the embodiment arranged as disclosed in the drawing in Fig. 2, the surface of the lens 10 adjacent the opening 14 of the fuselage was spherical and convex with a radius of curvature of about 20 inches. The opposite surface of that lens was approximately paraboloidal with the value of the latus rectum of the parabola equal to about 4 inches. Similarly, the surface of the lens 12 adjacent the lens 10 was approximately paraboloidal with the value of its latus rectum equal to 6 inches and the remaining surface of the lens 12 was spherical concave with a radius of curvature of about 24 inches. As stated above, these dimensions are only given by way of example and are not essential in themselves but only in relation to the indices of refraction of the glass or other optical material used, the thicknesses of the lenses and their separation.

The focal lengths and apertures of the remaining lenses 18, 20, 24, 38, 42 and 40 can be chosen so as to yield images of the desired magnification at the required position. However, in the model referred to above, lenses 18 and 20 were achromatic doublets of a diameter of 3 inches having a 15-inch focal length. Lens 24 was a simple double convex lens having a diameter of 6½ inches and having a focal length of 16 inches. These combined with lenses 10 and 12 made a system which was about 50 inches long from lens 12 to lens 24, and such a system could readily be installed in many aircraft by varying the proper characteristics of the individual lenses to increase or reduce the overall length and by proper disposition of the mirrors 48 and 50 used to alter the path of the rays in the system.

Another unusual characteristic of this invention is the use of the long focus large diameter eyepiece lens 24. With this eyepiece mounted on the instrument panel 44, as shown in Fig. 2, the eye distance, that is, the distance from the eyepiece to the eye, can be made exceptionally large. Normally the distance between the pilot's head and the instrument panel is between 20 and 30 inches and the proper selection of lenses produces an eye distance of the same length. The image may be set so as to appear at infinity or closer to the eye. It is normally advisable to set the virtual image distance somewhat closer than infinity since when the pilot shifts his gaze from beyond the aircraft to examine the instrument panel some accommodation takes place involuntarily. It has been found by trial that setting the virtual image distance at about 6 feet is satisfactory.

As a direct result of using this type of eyepiece lens, the instrument has an additional unusual characteristic in that it affords binocular vision. This binocular vision is the result of designing the instrument so that the eyepiece is viewed with both eyes and the rays from a particular point in the field of view pass the head of the observer in a cone of greater diameter than the distance between the eyes of the observer. The eyes of the observer each select a small pencil of rays from this cone and the rays in each of these pencils strike the objective at a slightly different angle. This gives a satisfactory stereoscopic effect for nearby objects. In the model described above, the cone of light comprising all the rays which enter one eye was about one-quarter inch in diameter at lens 18, and the separation between the two pencils of rays at lens 18 is about one inch. This means that a diameter of 3 inches for the erector lenses affords ample room for the entire image to reach both eyes.

Another unusual feature of this invention is that the pupil of the eye becomes the aperture-stop of the optical system shown in Figures 1 and 2 when it is used together with the eye. This is a decided advantage in eliminating the effect of geometrical aberrations since, except for distortion, the geometrical aberrations of astigmatism and coma are normally present at image 26. However, since the length of astigmatic lines is proportional to the size of the aperture, which is here the pupil of the eye, and since coma is proportional to the square of the size of the aperture, these aberrations are not noticeable except in an annulus of about 10° at the edge of the field. In addition, the magnification is very small so that these geometrical aberrations have little or no effect over the greater part of the field of view. Some lateral chromatism is also present but this is not noticeable except at the peripheral edge of the field. Of course the optical aberrations could be reduced by substituting suitably designed compound lenses for lenses 10 and 12, but it is one of the most desirable features of this invention that by using lenses having adjacent aspherical surfaces such as lenses 10 and 12 to form the objective assembly an excellent image is obtained which is relatively free from distortion, without the necessity of using compound corrected lenses.

An additional advantage of this invention is that the opening required in the fuselage to accommodate the system making up the view finder is of relatively small diameter in spite of the fact that such a wide angle of view is obtained. Because of the small aperture-stop in the system which is the pupil of the eye, as explained above, each cone of rays forming an image point is quite small. As shown in Fig. 3, these cones of rays do not coincide at a common plane perpendicular to the axis of the system, as in one of conventional design, but the points of coincidence extend along the axis and therefore the opening necessary is not as great as that which would normally be required. In the model referred to above having component parts of the dimensions stated, an opening 14 of about 2 inches in diameter located approximately 1½ inches in front of lens 10 was found to be large enough to admit all rays which reached the pilot's eyes. The opening 46 for the drift sight must be slightly larger with a diameter of about 3 inches. The centers of the two openings in the model described above were separated by about 4 inches but a greater distance may be used without difficulty if desired. These openings may be closed by suitable windows so that they do not substantially interfere with the air flow at the outer surface of the aircraft.

The preceding description has necessarily been somewhat general which is largely due to the fact that the system described is easily adapted to whatever physical arrangement is desired. The drawing and the above description are not intended to represent the only possible form of this invention, in regard to details of construction. Changes in form and in the proportion of parts, as well as the substitution of equivalents are contemplated, as circumstances may suggest or render expedient, without departing from the spirit or scope of this invention.

I claim:

1. In an optical instrument of the class described, an optical system forming the objective of said instrument which comprises two principal lens units disposed in at least substantially equivalent axial alignment, the first principal lens unit having a first principal refracting surface which is spherical and convex with a radius of curvature of approximately 20 inches and a second principal refracting surface which is approximately paraboloidal with the value of the latus rectum of the parabola equal to approximately 4 inches, the second principal lens unit having a first principal refracting surface which is approximately paraboloidal with the value of the latus rectum of the parabola equal to approximately 6 inches, the second principal refracting surface of the second principal lens unit being spherical and concave with a radius of curvature of approximately 24 inches, said lens units being sufficiently large in diameter to form an image of a distant object near said second principal lens unit, means for erecting said image and a long focus eye-piece lens of sufficient diameter.

2. In an optical instrument of the class described, an optical system forming the objective of said instrument which comprises two principal lens units disposed in at least substantially equivalent axial alignment, the first principal lens unit having a first principal refracting surface which is spherical and convex with a radius of curvature of approximately 20 inches and a second principal refracting surface which is approximately paraboloidal with the value of the latus rectum of the parabola equal to approximately 4 inches, the second principal lens unit having a first principal refracting surface which is approximately paraboloidal with the value of the latus rectum of the parabola equal to approximately 6 inches, the second principal refracting surface of the second principal lens unit being spherical and concave with a radius of curvature of approximately 24 inches, said lens units being sufficiently large in diameter to form an image of a distant object near said second principal lens unit, said image having a diameter greater than the combined equivalent focal length of said lens units, means for erecting said image and a long focus eye-piece lens of sufficient diameter.

3. In an optical instrument of the class described, an optical system forming the objective of said instrument which comprises two principal lens units disposed in at last substantially equivalent axial alignment, the first principal lens unit having a first principal refracting surface which is spherical and convex with a radius of curvature of approximately 20 inches and a second principal refracting surface which is approximately paraboloidal with the value of the latus rectum of the parabola equal to approximately 4 inches, the second principal lens unit having a first principal refracting surface which is approximately paraboloidal with the value of the latus rectum of the parabola equal to approximately 6 inches, the second principal refracting surface of the second principal lens unit being spherical and concave with a radius of curvature of approximately 24 inches, said lens unit being sufficiently large in diameter to form an image of a distant object near said second principal lens unit, a train of lenses forming a telescope, and image erecting means, means for selectively directing at will either the light transmitted through said aspheric lenses or that transmitted through said telescope through said erecting means, and an eye-piece lens having a diameter large enough to permit both eyes of the observer to simultaneously view a real image formed by said aspheric lenses and said erecting means.

4. In an optical instrument of the class described, an optical system forming the objective of said instrument which comprises two principal lens units disposed in at least substantially equivalent axial alignment, the first principal lens unit having a first principal refracting surface which is spherical and convex with a radius of curvature of approximately 20 inches and a second principal refracting surface which is approximately paraboloidal with the value of the latus rectum of the parabola equal to approximately 4 inches, the second principal lens unit having a first principal refracting surface which is approximately paraboloidal with the value of the latus rectum of the parabola equal to approximately 6 inches, the second principal refracting surface of the second principal lens unit being spherical and concave with a radius of curvature of approximately 24 inches, said lens units being sufficiently large in diameter to form an image of a distant object near said second principal lens unit, said image having a diameter greater than the combined equivalent focal length of said lens units, a train of lenses forming a telescope, and image erecting means, means for selectively directing at will either the light transmitted through said aspheric lenses or that transmitted through said telescope through said erecting means, and an eye-piece lens having a diameter large enough to permit both eyes of the observer to simultaneously view a real image formed by said aspheric lenses and said erecting means.

GEORGE S. MONK.

REFERENCES CITED

The following references are of record in the file of this patent:

UNITED STATES PATENTS

| Number | Name | Date |
| --- | --- | --- |
| 1,290,777 | O'Brien | Jan. 7, 1919 |
| 1,464,655 | Jacob | Aug. 14, 1923 |
| 1,621,741 | Kellner | Mar. 22, 1927 |
| 1,840,878 | Abrams | Jan. 12, 1932 |
| 2,140,979 | Bertele | Dec. 20, 1938 |
| 2,146,662 | Albada | Feb. 7, 1939 |
| 2,165,402 | Mihalyi | July 11, 1939 |
| 2,401,224 | Burton | May 28, 1946 |

FOREIGN PATENTS

| Number | Country | Date |
| --- | --- | --- |
| 9,214 | Great Britain | of 1901 |